3,190,808
NUCLEAR REACTOR POWERED STEAM GENERATING SYSTEMS

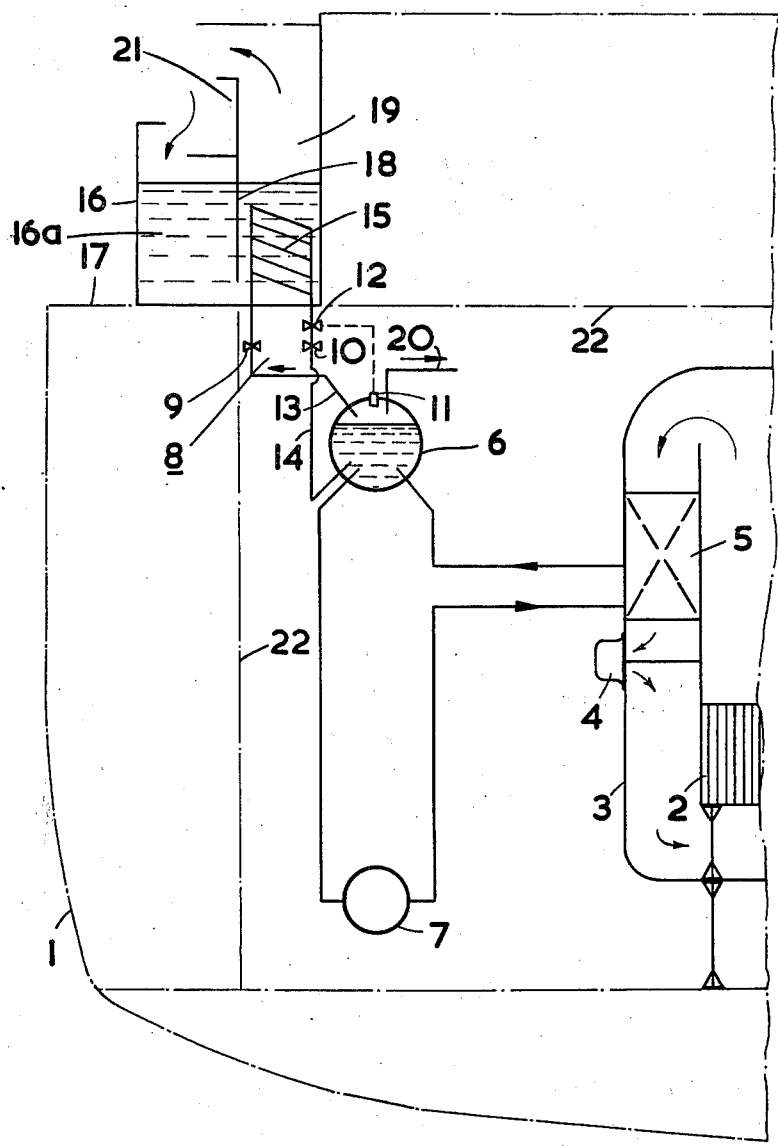

John Alan Dodd, Wallasey, England, assignor to United Kingdom Atomic Energy Authority, London, England
Filed May 31, 1961, Ser. No. 113,731
Claims priority, application Great Britain, June 1, 1960, 19,475/60
4 Claims. (Cl. 176—65)

This invention relates to nuclear reactor powered steam generating systems of the kind comprising a reactor and a steam generator heated by a coolant after passage through the reactor core.

The invention provides, in a system of the kind described, improved means for the removal of shut-down heat from the reactor core when pumping power is not available to circulate the coolant through the reactor core and the steam generator.

It is well known to provide a reactor with convection circulated emergency coolant facilities so that the reactor can continue to be cooled when no external power is available to circulate the coolant. These facilities are customarily provided by locating the steam generator at a higher level than the reactor core or by providing a separate emergency coolant circuit.

However, it is now considered that the provision of steam generators at a higher level is not in itself satisfactory as the maximum amount of heat that can be taken from the reactor core is that heat required to convert the water in the steam generators into steam. (This is based on the fact that there may be no power available to pump feed water into the steam generators.) Such heat removal may be inadequate and the reactor temperature may then rise dangerously.

Also, the provision of a separate emergency cooling circuit has disadvantages. It requires an outlet and return to the reactor coolant system and, for any emergency cooling apparatus to be useful, it must be accessible so that it can be cooled if necessary by water from a hose. If the emergency cooling apparatus is accessible it must be outside the vessel which is customarily provided to contain all reactor components which could give rise to escaped radioactive materials. A separate emergency coolant circuit will then transmit reactor coolant (which may be heavily contaminated with radioactive material) through the containment vessel and will thus destroy partly the function of the containment vessel.

A third point arises in that if the reactor is cooled by an organic liquid which can solidify at a temperature above ambient conditions steps must be taken to ensure that heat is not removed from the coolant at such a rate that it solidifies so that convection heat removal is caused to stop.

The above problems (which are very significant for a ship-borne system with possibly no access to emergency power supplies) are met in arrangements according to the invention as follows: the nuclear reactor powered steam generating system is provided with a steam generator at a higher level than the reactor core so that convection flow of reactor coolant can be maintained, the steam generator is supplied with water and arranged to feed steam to a steam drum disposed so that convection flow of water through the steam generator can be maintained and a circuit is provided for removal of steam from the drum so that the steam can be moved by convection flow through a heat sink and return as water to the drum.

If the system is to be used with an organic liquid coolant, a valve is provided in the circuit associated with the heat sink and the valve is arranged to be operated by conditions in the steam drum so that the valve closes should temperature or pressure fall in the steam drum so as to maintain the temperature of water in the drum above the solidification temperature of the reactor coolant. Preferably pressure is used for control as it is to be assumed that in the worst emergency conditions that no power is otherwise available to operate the valve.

The heat sink is preferably a tank of water provided with means for causing convection flow of air in the absence of water. This is well suited to the duty that has to be performed as the heat which has to be removed is, at first, very large but then diminishes. This can be related to a process in the tank whereby the water is first heated and boiled (high heat transfer rate) and then evaporated (diminishing heat transfer rate) and then air cooling takes over (low heat transfer rate).

An embodiment of the invention will now be described, by way of example, with reference to the accompanying diagrammatic drawing.

The drawing shows a nuclear reactor powered steam generating system in the hull 1 of a ship. The system comprises a retactor core 2 fuelled with sheathed fuel elements and contained within a pressure vessel 3. The reactor is cooled and moderated with an organic liquid (for example, "Sentowax R," a terphenyl-based commerical product with a solidification temperature of 300° F.), circulated by a pump 4 at 95 lbs. per square inch with a core inlet temperature of 670° F. and a steam generator comprising a heat exchanger 5 through which the organic liquid passes to generate steam which is separated from the water phase in a steam drum 6. The water is fed to the heat exchanger 5 by a pump 7. Associated with the steam drum 6 there is a thermosyphon arrangement 8 which extracts heat from the steam when valves 9, 10 are opened, the arrangement 8 being pressure controlled by a pressure sensitive valve 12. (Alternatively, temperature control is used by introducing a temperature sensitive element 11 in the steam drum 6.) The thermosyphon arrangement 8 has a connection 13 to the steam zone of the drum 6 and a connection 14 to the water zone and the connections 13, 14 join with a bank of inclined tubes 15. The tubes 15 provide a steam condenser and are contained within an open water storage tank 16 containing water 16a and disposed on the deck 17 of the ship. The mass of water 16a functions as a heat sink. The has an internal baffle 18, a chimney 19 and an air inlet 21.

A main steam outlet 20 is taken from the drum 6 to power the ship's engines. The system, with the exception of the tank 16 and associated tube bank 15 is enclosed in a containment 22, the connections 13, 14 being sealed in passage through the containment.

Whilst the drawing shows only one heat exchanger 5, drum 6 and thermosyphon arrangement 8, four are in fact provided orientated at 90° to one another so that in the event of the ship sinking at an angle at least one thermosyphon arrangement 8 will stay in service.

In the event of pumping power to the pumps 4 and 7 failing, the valves 9 and 10 are opened. The organic liquid in the vessel 3 continues to circulate by convection as the heat exchanger 15 is located above the core 2. The shut down heat that the core gives to the organic liquid is taken up in the heat exchanger 5 and given to the water in the heat exchanger 5 for the generation of steam. The generated steam passes to the drum 6 which is higher than the heat exchanger 5 so that a thermosyphon feed of water is maintained to the heat exchanger 5 for the generation of further steam. The steam leaves the steam drum 6 through the connection 13 whence it is condensed in the tubes 15 and returned to the water zone of the drum 6 through the connection 14. Again, a thermosyphon circulation is maintained. Should more heat be taken from the tubes 15 than is supplied by the shut down heat of the core 2 the temperature and pressure of the steam will fall. Any such fall (say to 300 lbs. per square inch with a corresponding temperature of 418° F.) causes the valve 12 to move towards the closed position (or is detected by the element 11 which moves the valve 12 towards the closed position) to reduce steam flow to the tubes 15 and hence reduces heat flow from the tubes 15, and hence reduces heat flow from the organic liquid. In this way solidification of the organic liquid in the heat exchanger 5 is avoided.

As heat is removed from the reactor coolant, the temperature of the water 16a serving as a heat sink rises to boiling point (high heat transfer rate) and then evaporates (diminishing heat transfer rate). Thereafter, heat is removed by a convection flow of air set up over the tubes 15 by the inlet 21, baffle 18 and chimney 19. Alternatively, heat can be removed by directing hoses on to the tubes 15 from deck level.

It will be noted that the only part of the system disposed outside the containment 22 is the tube bank 15 which, forming part of a secondary heat exchanger circuit, is uncontaminated with radioactive material in the event of failure of a fuel element sheath.

I claim:

1. A nuclear reactor powered steam generating system comprising, in combination; a reactor core, a heat exchanger disposed above the reactor core, means defining a closed circuit for convection flow of reactor coolant through the reactor core and one heat exchange side of the heat exchanger, a steam drum above the heat exchange, a main steam outlet from said drum, means defining a closed circuit for convection flow of feed water through the steam drum and the other heat exchanger side of the heat exchanger, a vented storage tank disposed above the steam drum, a mass of vapor-forming liquid within the tank, a steam condenser immersed in said liquid, and means defining a closed circuit for convection flow of steam through the steam drum and the steam side of the steam condenser.

2. A steam generating system as claimed in claim 1 wherein said liquid tank is provided with wall means defining, in the absence of substantially the whole of said liquid from the tank, a flow path for convection flow of air through the storage tank and over said steam condenser.

3. In a nuclear reactor powered steam generating system wherein the reactor coolant is an organic liquid the combination of: a heat exchanger disposed above the reactor core, means defining a closed circuit for convection flow of feed water through the steam drum and the one heat exchange side of the heat exchanger, a steam drum above the heat exchanger, a main steam outlet from said drum, means defining a closed circuit for convection flow of food water through the steam drum and the other heat exchange side of the heat exchanger, a vented storage tank disposed above the steam drum, a mass of vapor forming liquid within the tank, a steam condenser immersed in said liquid, means defining a closed circuit for convection flow of steam through the steam drum and the steam side of the steam condenser, a flow control valve in said closed circuit for convection flow of steam and means responsive to pressure conditions in the steam drum for closing the valve to maintain the temperature of water in the steam drum above the solidification temperature of the reactor coolant.

4. In a nuclear reactor powered steam generating system wherein the reactor coolant is an organic liquid the combination of: a heat exchanger disposed above the reactor core, means defining a closed circuit for convection flow of reactor coolant through the reactor core and one heat exchange side of the heat exchanger, a steam drum above the heat exchanger, a main steam outlet from said drum, means defining a closed circuit for convection flow of feed water through the steam drum and the other heat exchange side of the heat exchanger, a vented storage tank disposed above the steam drum, a mass of vapor-forming liquid within the tank, a steam condenser immersed in said liquid, means defining a close circuit for convection flow of steam through the steam drum and the steam side of the steam condenser, a flow control valve in said closed circuit for convection flow of steam and means responsive to temperature conditions in the steam drum for closing the valve to maintain the temperature of water in the steam drum above the solidification temperature of the reactor coolant.

References Cited by the Examiner

UNITED STATES PATENTS

| | | | |
|---|---|---|---|
| 2,921,891 | 1/60 | Colichman | 204—193.32 |
| 2,957,815 | 10/60 | Pacault et al. | 204—193.26 |
| 2,961,393 | 11/60 | Monson | 204—193.2 |

FOREIGN PATENTS

| | | |
|---|---|---|
| 214,136 | 3/58 | Australia. |
| 1,184,886 | 2/59 | France. |
| 1,062,837 | 8/59 | Germany. |

OTHER REFERENCES

Peaceful Uses of Atomic Energy, Geneva 1958, Nuclear Power Plants, Part 2, volume 9, page 251, "Air-Cooled Condenser," Braun.

REUBEN EPSTEIN, *Acting Primary Examiner.*

CARL D. QUARFORTH, *Examiner.*